United States Patent [19]
Paik et al.

[11] Patent Number: 6,148,312
[45] Date of Patent: Nov. 14, 2000

[54] METHOD AND SYSTEM FOR ELECTRONIC ARTICLE MAINTENANCE AND DELETION

[75] Inventors: Young Paik, San Jose; Julie Lewis, Fremont; Janet M. Kaul, Santa Clara, all of Calif.

[73] Assignee: Synopsys, Inc., Mountain View, Calif.

[21] Appl. No.: 09/417,253

[22] Filed: Oct. 12, 1999

Related U.S. Application Data

[62] Division of application No. 08/801,726, Feb. 12, 1997.

[51] Int. Cl.[7] ..................................................... G06F 17/21
[52] U.S. Cl. ............................................................ 707/530
[58] Field of Search ............................................. 707/530

[56] References Cited

U.S. PATENT DOCUMENTS

| | | |
|---|---|---|
| 4,866,611 | 9/1989 | Cree et al. .............................. 345/168 |
| 5,051,891 | 9/1991 | MacPhail ................................ 707/200 |
| 5,297,278 | 3/1994 | Wang et al. ............................. 707/200 |
| 5,408,470 | 4/1995 | Rothrock et al. ....................... 345/330 |

*Primary Examiner*—Jack Choules
*Attorney, Agent, or Firm*—Wagner Murabito & Hao LLP

[57] ABSTRACT

A system and method for automated electronic document maintenance/deletion of articles in an electronic document system. In one embodiment, the present invention determines whether the contents of an electronic copy of an article are accurately reflected in metadata corresponding to the electronic copy of the article. In the present embodiment, the electronic copy of the article is believed to be located within an electronic document system. Next, provided metadata corresponding to the electronic copy of the article does not exist, the present embodiment creates metadata corresponding to the electronic copy of the article. Provided that the electronic copy of the article can not be located within the electronic document system, the present invention deletes any metadata corresponding to the electronic copy of the article.

7 Claims, 4 Drawing Sheets

FIG. 4

METHOD AND SYSTEM FOR ELECTRONIC ARTICLE MAINTENANCE AND DELETION

This is a divisional of copending application Ser. No. 08/801,726 filed on Feb. 12, 1997.

TECHNICAL FIELD

This invention relates to electronic document management. Specifically, the present invention relates to maintaining articles in and deleting articles from an electronic document management system.

BACKGROUND ART

The Internet, including the World Wide Web (hereinafter the Web), makes a large amount of information accessible to anyone connected to the Internet. In order to access the Internet, a user typically subscribes to an on-line service provider. Using, for example, a modem coupled to a computer, the user contacts the service provider who, in turn, connects the user to the Internet. Once the user is coupled to the Internet, the user is said to be "on-line" (a user who is not on-line is referred to as being "off-line"). When on-line, the user is able to access numerous resources available through conduits such as, for example, the Web.

The Web is comprised of voluminous linked "sites". Various linked Web sites contain information of virtually innumerable type, style, and content. Web sites are often comprised of a plurality of Web documents referred to as Web pages. In general, the layout language for a Web document is Hypertext Markup Language (HTML). Web documents are stored in HTML format in association with "server" software on remote servers. A Web document is given a "Uniform Resource Locator" (URL) which is essentially an address path identifying the server which hosts the desired document plus the location of the document on the server. Using a "browser" software, an end-user can send a request from a client computer to access a document stored at a particular URL. Browser software such as Netscape™ Navigator, of Netscape Communications Corporation of Mountain View, Calif., is well known and widely available. When the server receives the user's request, it sends the requested HTML Web document to the client where the document can be displayed. The communications protocol used in making such a request and in transferring Web documents is "Hypertext Transfer Protocol" (HTTP). For more information about the Web, see for example T. Berners-Lee, R. Cailliau, A. Loutonen, H. F. Nielsen, and A. Secret, "The World Wide Web," *Communications of the ACM,* vol. 37(8), August 1994.

In addition to the Internet, other "limited access on-line" information retrieval systems such as "Intranet" systems also exist. An Intranet system operates in a manner similar to the manner in which a conventional Internet system operates. However, access to the Intranet is controlled/restricted, for example, to a specific user group, or to users accessing the Intranet from specified locations. In a business environment, for example, an Intranet system containing information relevant to a particular business may only be accessed from terminals present on the grounds of the business. In so doing, it is presumed that the business' information will only be accessed by employees. Similarly, access to the Intranet can be limited only to users knowing, for example, a specific password. Thus, the business' Intranet system is not available to the general public. Like the Internet, information contained in an Intranet system is frequently arranged in Web sites comprised of various linked Web pages.

Although Internet and Intranet systems conveniently provide information to various users, maintaining articles within or deleting articles from an Internet or Intranet system is often a complex and time-consuming task. Maintaining or updating an article typically involves verifying that the correct metadata records exist for a given article, verifying that an article exists for a given metadata record. Internet and Intranet maintenance further includes determining whether the most current version of an article is contained within the Internet or Intranet system, and insuring that articles are properly archived. For purposes of the present application, archiving refers to removing an article from active retrieval, or requiring special retrieval commands to any Internet or Intranet system, including search engines. In addition to maintaining articles, it is often necessary to delete articles from an Internet or Intranet system. Deleting an article from an Internet or Intranet system often requires contacting the content creator. In many instances, contacting the content creator is not an simple task for the average Internet or Intranet user. Thus, it can be quite difficult for the average Internet or Intranet user to maintain/update articles in or delete articles from an Internet or Intranet system. Because it is so difficult for users to maintain and/or delete articles, many Internet or Intranet systems have one or more persons solely dedicated to performing such tasks. Such persons are commonly referred to as webmasters. As a result of requiring a webmaster or webmasters, conventional Internet and Intranet systems have substantial additional cost associated therewith.

Thus, a need exists for a method and system which efficiently allows a user to evaluate the status of articles in an Internet or Intranet system. A further need exists for a method and system for efficiently archiving articles in an Internet or Intranet system. Yet another need exists for a system and method which allows a user to readily delete articles from an Internet or Intranet system.

DISCLOSURE OF THE INVENTION

The present invention provides a method and system which efficiently allows a user to evaluate the status of articles in an Internet or Intranet system; a method and system for efficiently archiving articles in an Internet or Intranet system; and a system and method which allows a user to readily delete articles from an Internet or Intranet system.

Specifically, in one embodiment, the present invention determines whether the contents of an electronic copy of an article are accurately reflected in metadata corresponding to the electronic copy of the article. In the present embodiment, the electronic copy of the article is believed to be located within an electronic document system. Next, provided metadata corresponding to the electronic copy of the article does not exist, the present embodiment creates metadata corresponding to the electronic copy of the article. Provided that the electronic copy of the article can not be located within the electronic document system, the present invention deletes any metadata corresponding to the electronic copy of the article.

In another embodiment, the present invention receives an article version identifier. The article version identifier is associated with one of a plurality of versions of an electronic copy of an article. Each of the plurality of versions of the electronic copy of the article is contained within an electronic document system. Next, the present invention archives those electronic copies of the article which are not associated with the article version identifier. After the archiving step, the present invention updates metadata associated with the archived versions of the article, such that the updated metadata indicates which of the plurality of the versions of the electronic copy of the article are archived.

In yet another embodiment, the present invention receives a request to delete an electronic copy of an article from an electronic document system. The present invention then forwards the request to delete the electronic copy of the article to a delete site. At the delete site, the present invention generates a formatted request to delete the electronic copy of the article. Next, the present invention forwards the formatted request to delete the electronic copy of the article to the content creator of the article. After receiving a response to the formatted request from the content creator of the article, the present invention deletes the electronic copy of the article from the electronic document system.

Thus, the present invention provides a method and system which efficiently allows a user to evaluate the status of articles in an Internet or Intranet system; a method and system for efficiently archiving articles in an Internet or Intranet system; and a system and method which allows a user to readily delete articles from an Internet or Intranet system.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "determining," "forwarding," "deleting," "archiving," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Figure 1:
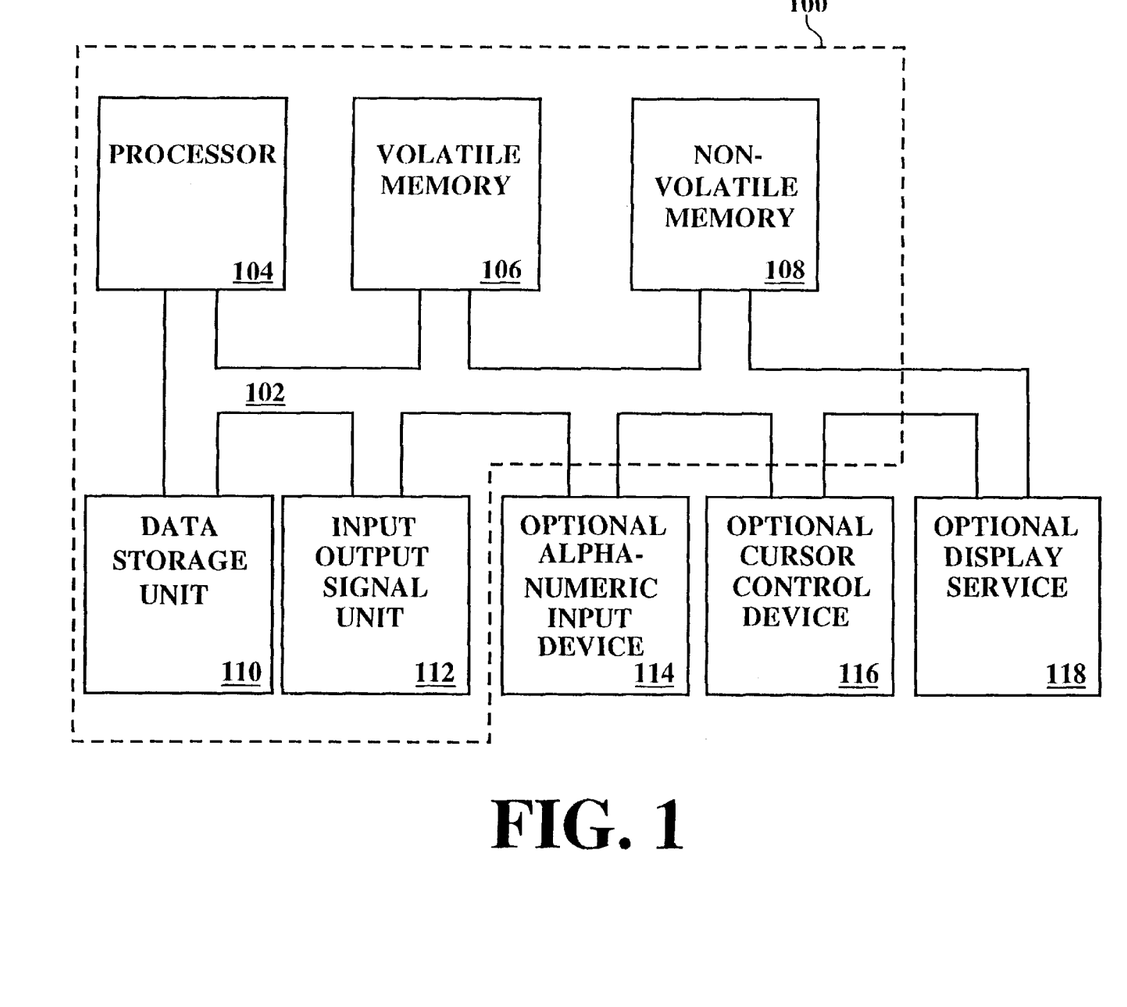
FIG. 1 is a schematic diagram of an exemplary computer system used as a part of an automated electronic document maintenance/deletion (AEDMD) system in accordance with the present invention.

With reference now to FIG. 1, portions of the present automated electronic document maintenance/deletion (AEDMD) system are comprised of computer-readable and computer-executable instructions which reside, for example, in computer-usable media of a computer system. FIG. 1 illustrates an exemplary computer system 100 used as a part of an AEDMD system in accordance with the present invention. It is appreciated that system 100 of FIG. 1 is exemplary only and that the present invention can operate within a number of different computer systems including general purpose computers systems, embedded computer systems, and stand alone computer systems specially adapted for automatic system error analysis.

System 100 of FIG. 1 includes an address/data bus 102 for communicating information, and a central processor unit 104 coupled to bus 102 for processing information and instructions. System 100 also incudes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. A signal input output comm device 112 (e.g. a modem) coupled to bus 102 is also included in system 100 of FIG. 1. System 100 of the present AEDMD embodiment also includes an optional alphanumeric input device 114 including alphanumeric and function keys is coupled to bus 102 for communicating information and command selections to central processor unit 104. System 100 also optionally includes a cursor control device 116 coupled to bus 102 for communicating user input information and command selections to central processor unit 104. System 100 of the present embodiment also includes an optional display device 118 coupled to bus 102 for displaying information.

Display device 118 of FIG. 1, utilized with the present AEDMD system, may be a liquid crystal device, cathode ray tube, or other display device suitable for creating graphic images and alphanumeric characters recognizable to a user. Optional cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands. A more detailed discussion of the present AEDMD system and the steps performed by the AEDMD system is found below.

GENERAL DESCRIPTION OF THE AUTOMATIC SYSTEM ERROR ANALYSIS SYSTEM OF THE PRESENT INVENTION

Figure 2:
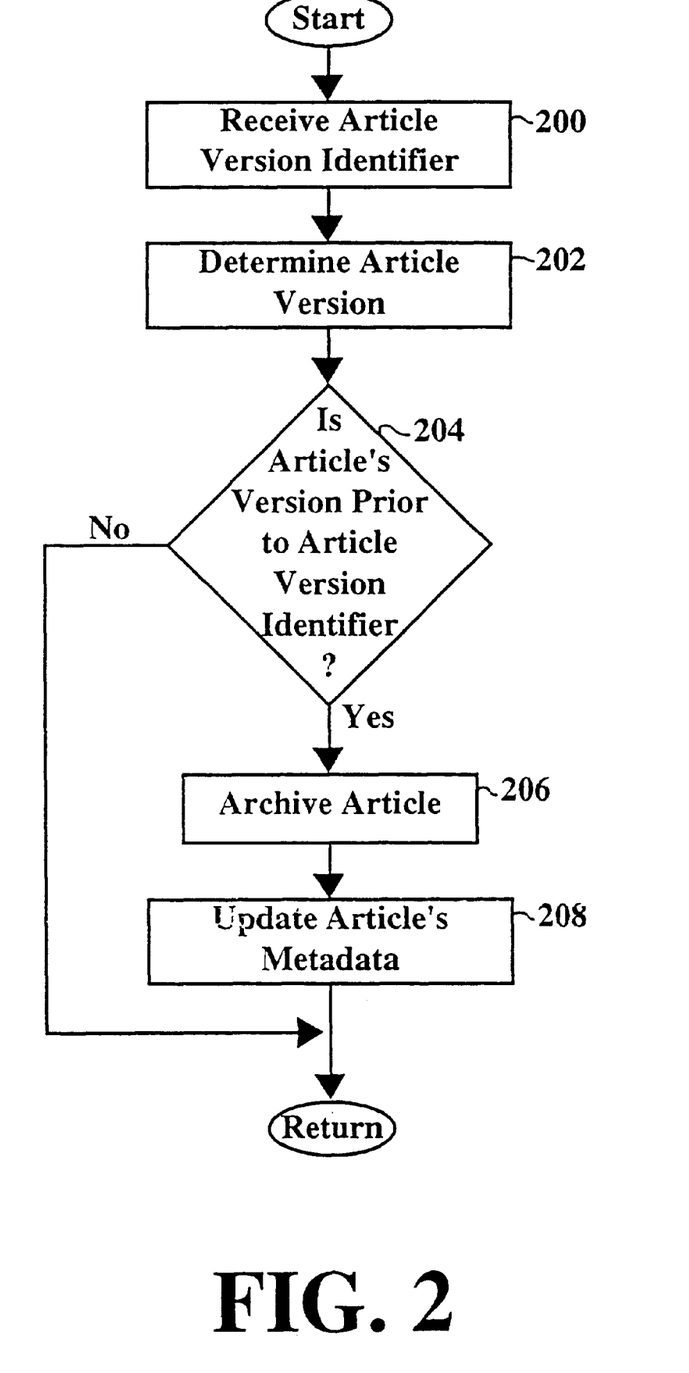
FIG. 2 is a flow chart illustrating steps performed by one embodiment of the present AEDMD system in accordance with the present claimed invention.

With reference next to FIG. 2, a flow chart 200 of steps used by one embodiment of the present AEDMD system is shown. Flow chart 200 includes processes of the present AEDMD system which are comprised of computer-readable and computer-executable instructions. The computer-readable and computer-executable instructions reside, for example, in data storage features such as computer usable volatile memory 106 and/or computer usable non-volatile memory 108. The computer-readable and computer-executable instructions are used to control, for example, the operation and functioning of central processor unit 104. In step 201, the present invention receives an article version identifier. As an example, the present embodiment receives from a user of the present invention, the version number of the most recent version of an article. In the present embodiment, it will be understood that the electronic document system may contain several versions of the same article. As an example, a newer version of an article may contain revisions, additions, deletions, and the like which are not found in an older version of the article. For purposes of the present application, the electronic document system is comprised, for example, of the Internet or an Intranet. However, the present invention is also well suited to use with various other types of electronic document systems.

As shown in step 202, the present invention then determines which of a plurality of versions of the article is associated with the article version identifier. In the above example, the most recent version of the article is associated with the article version identifier.

At step 204, the present embodiment of the invention determines, for each of the plurality of versions of the article, whether each respective version is older than the version associated with the received version identifier. In the present example, the present invention would find that all existing versions, except for the most recent version, would be older than the version associated with the received version identifier.

As shown in step 206, the present embodiment archives every version which is older than the version of the article associated with the article version identifier. The present embodiment places the archived versions of the article into an archive file.

Next, at step 208, the present embodiment updates the metadata (e.g. identifying information such as the title, content, and the like) associated with the archived versions of the article to indicate that the versions have been archived. Thus, a user seeking to access an older archived version of the article will be informed that the version has previously been archived. The present embodiment is, however, well suited to allowing the user to access archived versions of the desired article. Additionally, the present embodiment is also well suited to entering metadata of the article into, for example, a relational database management system, a flat file database, or other database system. As shown in step 204, when an article version is not older than the article associated with the received article version identifier, the present embodiment skips steps 206 and 208. Also, the present embodiment is well suited to initiating the steps of flow chart 200, based upon any one of numerous conditions. For example, the present invention is well suited to periodically automatically archiving all but the most recent version of the plurality of versions of the article. The present embodiment is further well suited to automatically archiving all but the most recent version of the plurality of versions of the article when the plurality of versions of the article exceeds a predetermined quantity. In yet another embodiment, the present invention automatically archives all but the most recent version of the plurality of versions of the article when prompted to do so by a user.

An example of computer-readable and computer-executable instructions for performing the present embodiment are given below. As mentioned above, such computer-readable and computer-executable instructions reside, for example, in data storage features such as computer usable volatile memory 106 and/or computer usable non-volatile memory 108 of FIG. 1.

```
#! /usr/local/bin/sybperl
$cc= "jmk ypaik";
$debug = 1;
These are temporary
sub log {
        print ("@_");
}
sub fatal (
        die ("@_");
}
sub error {
        warn ("@_");
}
#Set up some initial parameters
$ | =1;
$ENV ('DSQUERY') = "SYB_PROD01";
$sourcefile="/home/solvitsub/dbase/source_descriptions";
chop ($user= 'whoami');
#Get the info for which files to archive
if ($#ARGV ! = 2) {
    die ( "
    usage: $0 endversion toolabbreviation origin\n      where: origin is {in | ex } \n");
}
&load_sources;
($version_to, $product_code, $origin) = @ARGV;
@archfiles=&archive_list (@ARGV);
@archfiles=&archive_list (@ARGV);
foreach $archfile (@archfiles) {
    next if ($archfile = ~ /_deleted/);
    next if ($archfile = ~ /Archive/);
    ($doc_id) = $archfile = ~ /\/([ ^\/]+)$/;
    ($source) = $archfile = ~ /\/([ ^\/]+)\/$doc_id$/;
    $body {$source}. = "Archive: $doc_id\n";
}
$subj = "Archived SOLV-IT! articles";
foreach $key (keys %body) {
    &mail_off("key-$origin", $user. $subj, "$body {$key} \n"," ");
# print     "($to, $user, $subj, $body {$key} ) \n";
}
print "Done \n";
exit 0;
sub archive_list {
    local ($origin, $version_to, $product_code) = @_;
    local (@results, @out) = ( );
    $dbproc=&dblogin ("solvit", "solvit");
    &dbuse ($dbproc, "solvit" );
    &dbcmd ($dbproc, "solvit_metadata_archive \ $origin\", \"$version_to\",
    \ "$product_co
de\ " ");
    &dbsqlexec($dbproc);
    &dbresults($dbproc);
    while {@results = &dbnextrow ($dbproc)) {
        for     $i     (0..$#results) {
                $results [$i] = ~s / \ s + / / g;
        }
        @out= (@out, @results);
    }
&dbclose ($dbproc);
return @out;
}
sub load_sources {
    open (SOURCEFILE, $sourcefile) | | die ("This program must be run on tiedye");
    @lines=<SOURCEFILE>;
    close (SOURCEFILE);
    foreach $n (0..$# lines) {
        if ($lines [$n] = ~ / ^name: \s* ( [ ^\s] + ) \ s * /) {
            ($source) = $1;
            ($abrv {$source} ) =$lines [$n+1] = ~ / ^abbrev: \ s * ( [ ^ \s* /;
        }
    }
}
```

-continued

```
sub mail_off {
    local ($to, $from, $subj, $cont, $cc) =@_;
    if ($debug==1) {
        print   "To: $to\n";
        print   "From: $from \n";
        print   "Cc: ypaik\n";
        print   "Subject: $sub\n\n";
        print   "$cont\n"
    }
    else {
        open (MAIL, " | /usr/lib/sendmail -oi -t") | | die ("Can't send mail\n");
        print   MAIL    "To: $to\n";
        print   MAIL    "From: $from \ n ";
        print   MAIL    "Cc: ypaik\n";
        print   MAIL    "Subject: $subj\n\n";
        print   MAIL    "$cont\n";
        close (MAIL);
    }
}
```

Figure 3:
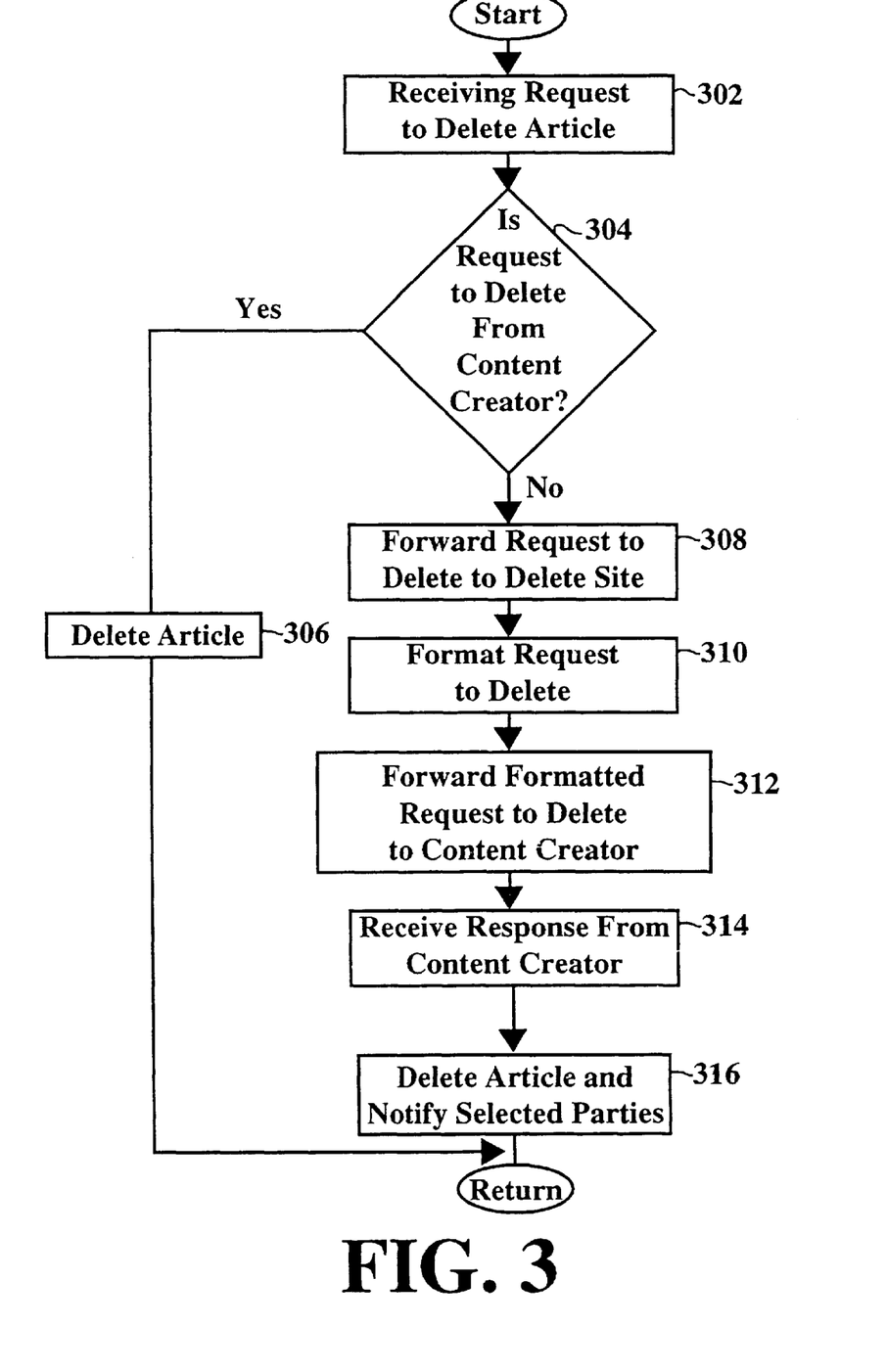
FIG. 3 is a flow chart illustrating steps performed by another embodiment of the present AEDMD system in accordance with the present claimed invention.

With reference next to FIG. 3, a flow chart 300 of steps used by another embodiment of the present AEDMD system is shown. Flow chart 300 includes processes of the present AEDMD system which are comprised of computer-readable and computer-executable instructions. The computer-readable and computer-executable instructions reside, for example, in data storage features such as computer usable volatile memory 106 and/or computer usable non-volatile memory 108. The computer-readable and computer-executable instructions are used to control, for example, the operation and functioning of central processor unit 104. In step 302, the present invention receives a request to delete an article. The request is generated, for example, by a user who wishes purge the electronic document system of unnecessary or outdated articles.

At step 304, the present embodiment of the present AEDMD system determines if the request to delete is from the content creator of the article desired to be deleted. If so, the present embodiment immediately deletes the article from the electronic document system as shown in step 306. If the request to delete the article does not come from the content creator, the present embodiment then proceeds to step 308.

As shown in step 308, the present embodiment forwards the request to delete to a delete site. In the present embodiment, the request to delete is forwarded by the present embodiment to a URL or e-mail address associated with the delete site.

Referring next to step 310, at the delete site, the present embodiment formats the request to delete. Specifically, the present invention restructures the request to delete by adding the electronic address of the user initially generating the request to delete and by including instructions on how to respond to the request to delete. Although such formatting steps are performed by the present embodiment, the present invention is also well suited to formatting the request to delete in various other manners.

At step 312, the present embodiment then forwards the formatted request to delete to the content creator. In the present embodiment, the request to delete is forwarded by the present embodiment to a URL or e-mail address associated with the content creator.

At step 314, upon receiving an affirmative response from the content creator, the present embodiment then removes the article from the electronic document system. A typical affirmative response from the content creator simply indicates that the article is no longer needed in the electronic document system. Although a response from the content creator is employed in the present embodiment, the present invention is also well suited to simply notifying the content creator that an article is going to be or has already been deleted by the invention described in FIG. 3.

As shown in step 316, the present invention then deletes the article indicated in the request to delete. Additionally, the present invention also deletes the metadata associated with the deleted article. Finally, a notice of the deletion is sent to selected parties. In the present embodiment, these selected parties include, but are not limited to, the author of the article, the requestor of the deletion, a knowledgeable manager, and/or a reviewer (if applicable). As a result, the present embodiment not only removes an undesired article, but also updates metadata to reflect the fact that the article has been removed from the electronic document system.

Figure 4:
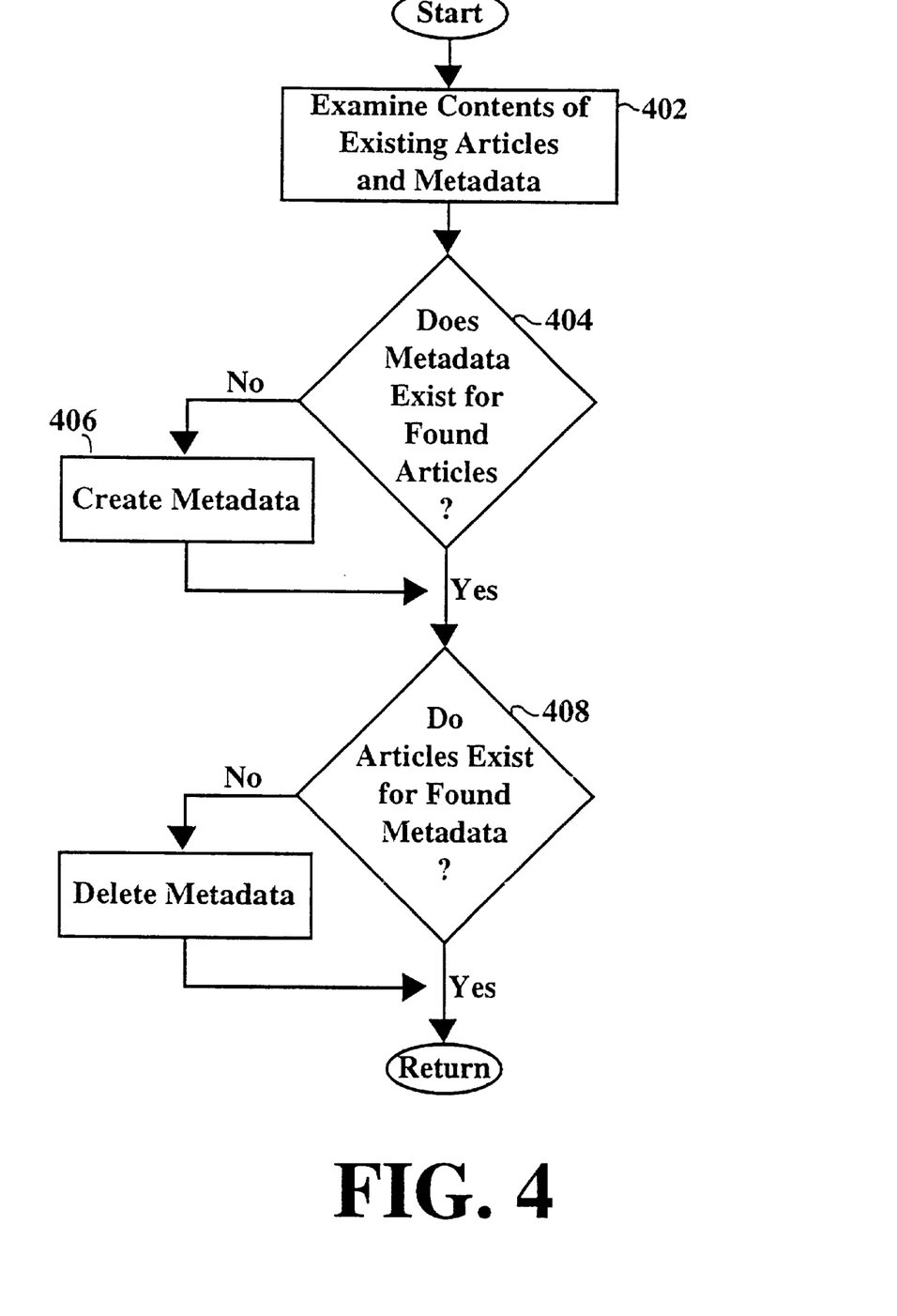
FIG. 4 is a flow chart illustrating steps performed by still another embodiment of the present AEDMD system in accordance with the present claimed invention.

With reference next to FIG. 4, a flow chart 400 of steps used by yet another embodiment of the present AEDMD system is shown. Flow chart 400 includes processes of the present AEDMD system which are comprised of computer-readable and computer-executable instructions. The computer-readable and computer-executable instructions reside, for example, in data storage features such as computer usable volatile memory 106 and/or computer usable non-volatile memory 108. The computer-readable and computer-executable instructions are used to control, for example, the operation and functioning of central processor unit 104. In step 402, the present invention examines the contents of existing articles and corresponding metadata residing within an electronic document system and/or database.

At step 404, the present embodiment then determines whether any metadata exists for the examined articles. If no metadata exists for an article residing within the electronic document system, the present embodiment proceeds to step 406.

At step 406, where no metadata exists for an article residing within the electronic document system, the present embodiment creates metadata for the examined article or articles. Thus, the present embodiment updates the electronic document system to properly include corresponding metadata for every article in the electronic document system.

If at step 404, metadata does exist for the articles residing within the electronic document system, the present embodiment proceeds to step 408.

At step 408, the present invention determines whether articles exist for examined metadata. If no article can be located for examined metadata, the present embodiment proceeds to step 410.

As shown in step 410, when no article can be located for examined metadata, the present embodiment deletes the metadata from the electronic document system. In so doing, the present invention automatically updates articles and metadata from an electronic document system.

The present AEDMD system is also able to use the various above-described embodiments in conjunction with each other. In so doing, the present invention provides substantial versatility and numerous options for, archiving, deleting, and updating articles of an electronic document system.

Thus, the present invention provides a method and system which efficiently allows a user to evaluate the status of articles in an Internet or Intranet system; a method and system for efficiently archiving articles in an Internet or Intranet system; and a system and method which allows a user to readily delete articles from an Internet or Intranet system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-usable medium having computer-readable program code embodied therein for causing a computer to perform the steps of a) receiving a request to delete an electronic copy of an article from an electronic document system;

b) forwarding said request to delete said electronic copy of said article to a delete site;

c) formatting said request to delete said electronic copy of said article at said delete site such that a formatted request to delete said electronic copy of said article is generated;

d) forwarding said formatted request to delete said electronic copy of said article to the content creator of said article; and e) deleting said electronic copy of said article from said electronic document system after receiving, from said content creator of said article, a response to said formatted request to delete said electronic copy of said article.

2. The computer-usable medium of claim 1 wherein said computer-readable program code embodied therein causes a computer performing step a) to further perform the step of:

receiving a request to delete an electronic copy of an article from the Internet.

3. The computer-usable medium of claim 1, wherein said computer-readable program code embodied therein causes a computer performing step a) to further perform the step of:

receiving a request to delete an electronic copy of an article from an Intranet.

4. The computer-usable medium of claim 1 wherein said computer-readable program code embodied therein causes a computer performing step c) to further perform the step of:

adding to said formatted request to delete said electronic copy of said article, the electronic address of a user initially generating said request to delete said electronic copy of said article from said electronic document system.

5. The computer-usable medium of claim 1 wherein said computer-readable program code embodied therein causes a computer performing step c) to further perform the step of:

adding to said formatted request to delete said electronic copy of said article, instructions for the content creator of said article describing how to respond to said formatted request to delete said electronic copy of said article.

6. The computer-usable medium of claim 1 wherein said computer-readable program code embodied therein causes a computer performing step d) to further perform the steps of:

d1) forward said formatted request to delete said electronic copy of said article to a default reviewer provided said content creator of said article is unavailable; and d2) deleting said electronic copy of said article from said electronic document system after receiving, from said default reviewer of said article, a response to said formatted request to delete said electronic copy of said article.

7. The computer-usable medium of claim 1 wherein said computer-readable program code embodied therein causes a computer performing step e) to further perform the step of:

deleting metadata associated with electronic copy of said article which has been deleted from said electronic document system.

* * * * *